(12) United States Patent
Grywacheski et al.

(10) Patent No.: US 6,251,009 B1
(45) Date of Patent: Jun. 26, 2001

(54) STRAW CHOPPER HOUSING

(75) Inventors: Sheldon Joseph Grywacheski, Eldridge, IA (US); Michael Dwain Benhart, Rock Island, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/369,654

(22) Filed: Aug. 6, 1999

(51) Int. Cl.[7] .................................................. A01F 12/40
(52) U.S. Cl. ............................................. 460/112; 56/504
(58) Field of Search ........................... 56/14.6, 504, 14.4, 56/13.7, 192; 460/78, 73, 112, 83; 239/650, 681; 241/186.3, 186.4

(56) References Cited

U.S. PATENT DOCUMENTS

| | | | |
|---|---|---|---|
| 3,712,309 | * 1/1973 | Schmitz | 460/112 |
| 3,717,062 | 2/1973 | Gaeddert | 146/107 |
| 3,815,823 | * 6/1974 | Johnson | 239/650 |
| 4,628,946 | * 12/1986 | De Busscher et al. | 460/112 |
| 4,669,489 | 6/1987 | Schraeder et al. | 130/27 R |
| 5,232,405 | 8/1993 | Redekop et al. | 460/112 |
| 5,482,508 | 1/1996 | Redekop et al. | 460/112 |
| 5,501,635 | 3/1996 | Niermann | 460/112 |
| 5,944,604 | * 8/1999 | Niermann et al. | 460/112 |

FOREIGN PATENT DOCUMENTS

| | | |
|---|---|---|
| 1 057 375 | 5/1959 | (DE) . |
| 3 1 19 954 | 12/1982 | (DE) . |
| 2 075 422 | 10/1971 | (FR) . |
| 2108333 | 5/1972 | (FR) . |
| 88/00801 | 3/1990 | (WO) . |

* cited by examiner

Primary Examiner—Robert E. Pezzuto

(57) ABSTRACT

A straw chopper for a combine harvester having a chopper housing mounted to a combine for rotation about a transverse axis. The housing is movable from a chopping position, in which the chopper receives straw from the separator of the combine and chops and spreads the straw over a wide area, to a rearwardly raised windrowing position, in which straw falls from the combine to the ground in front of the chopper housing. By rotating the housing rearward and upward, increased access into the rear of the combine is possible. An electric motor driven lift actuator is provided to raise the chopper housing to the windrowing position where a mechanical latch locks the housing to the combine structure.

11 Claims, 4 Drawing Sheets

STRAW CHOPPER HOUSING

BACKGROUND OF THE INVENTION

1. Field of the Invention

The present invention is related to a straw chopper for a combine and in particular to a straw chopper housing mounted to the combine for rotation about a transverse axis to move the straw chopper housing from a chopping position to a windrowing position.

2. Description of the Related Art

In a typical combine harvester, crop residue from the separator, also referred to as straw, is discharged from the hood structure at the rear of the combine. The straw is already somewhat reduced in size from the threshing and separating operations. If it is desired to reduce the size of the straw further, it is passed through a straw chopper. With current agricultural practices that eliminate or reduce tillage of the soil prior to planting, it is necessary to chop the straw into many small particles and then disperse the chopped straw over a wide area, generally equal to the width of the harvesting platform. As platforms have increased in width, it has been necessary to provide increasing width in the dispersion of straw at the rear of the combine.

Straw choppers have been used at the rear of the combine to chop the straw into small particles and to disperse the chopped straw over a wide area. The most common type of straw chopper consists of a transversely mounted flail rotor associated with a transverse array of fixed shear blades carried in a housing. The housing has an inlet opening and is supported beneath the combine hood to intercept the flow of straw from the separator. In some harvesting conditions, or to preserve longer straw for later collection, it is desired to return the straw to the ground in a narrow width windrow immediately beneath the combine hood without passing the straw through the chopper or widely dispersing the straw.

A straw chopper mounting for a combine is shown in patent 4,669,489 where a rear mounted straw chopper receives the straw from the straw walkers of the combine and discharges chopped straw rearwardly. The chopper is slidably supported on a pair of spaced apart, longitudinally oriented guide rails so that the chopper can be adjusted from a rearward chopping position to a forward windrowing position in which straw bypasses the chopper by dropping from the combine behind the chopper. Movement of the chopper on the guide rails is facilitated by attachment of a transverse shaft and sprocket assembly to the straw chopper housing. Teeth of the sprockets engage longitudinally spaced openings in the guide rails. Upon rotation of the shaft, the sprockets and guide rails cooperate in rack and pinion fashion to propel the chopper assembly along the rails while maintaining the chopper assembly in square alignment. The shaft is rotated by means of a wrench engaging flats on one end of the shaft.

Other straw choppers are mounted in a fixed position to the combine side sheets and use moving baffles or doors to direct the straw either into the chopper or directly to the ground for windrowing. With a fixed position chopper, the chopper restricts access to the rear of the combine for servicing or cleaning.

SUMMARY OF THE INVENTION

It is an object of the present invention to provide a straw chopper that is conveniently moved from a chopping position to a windrowing position to provide access to the rear of the combine for servicing operations.

It is a feature of the straw chopper of the present invention that the chopper housing is pivotally mounted to the combine side sheets for rotation about a transverse axis. The chopper housing is rotated upward and rearward from a chopping position to a windrowing position, allowing straw to drop to the ground forward of the chopper in the windrowing position. The chopper includes an inlet door that is mounted to the combine side sheets and is inclined downwardly and rearwardly from the rear end of the cleaning shoe. The inlet door directs both straw and chaff into the chopper. The inlet door is pivotally mounted to the combine such that when the chopper housing is in the windrowing position, the inlet door can be rotated downward from the inclined position to a vertical position to further improve access to the rear of the combine. In addition, the inlet door can be rotated upward to a generally horizontal, rearwardly extending position to provide convenient access to a tow hook mounted on the rear axle of the combine.

Another feature of the invention is a powered lift actuator to move the chopper housing between the chopping and windrowing positions. The powered lift actuator is preferably an electric motor driven screw actuator. A switch is provided on the side of the combine to enable the operator to raise or lower the chopper housing using electric power. The combine engine need not be operating to move the chopper housing. When the chopper housing is raised into the windrowing position, a latch automatically engages to attach the chopper housing to the combine structure, thereby relieving the load from the lift actuator.

DESCRIPTION OF THE PREFERRED EMBODIMENT

Figure 1:
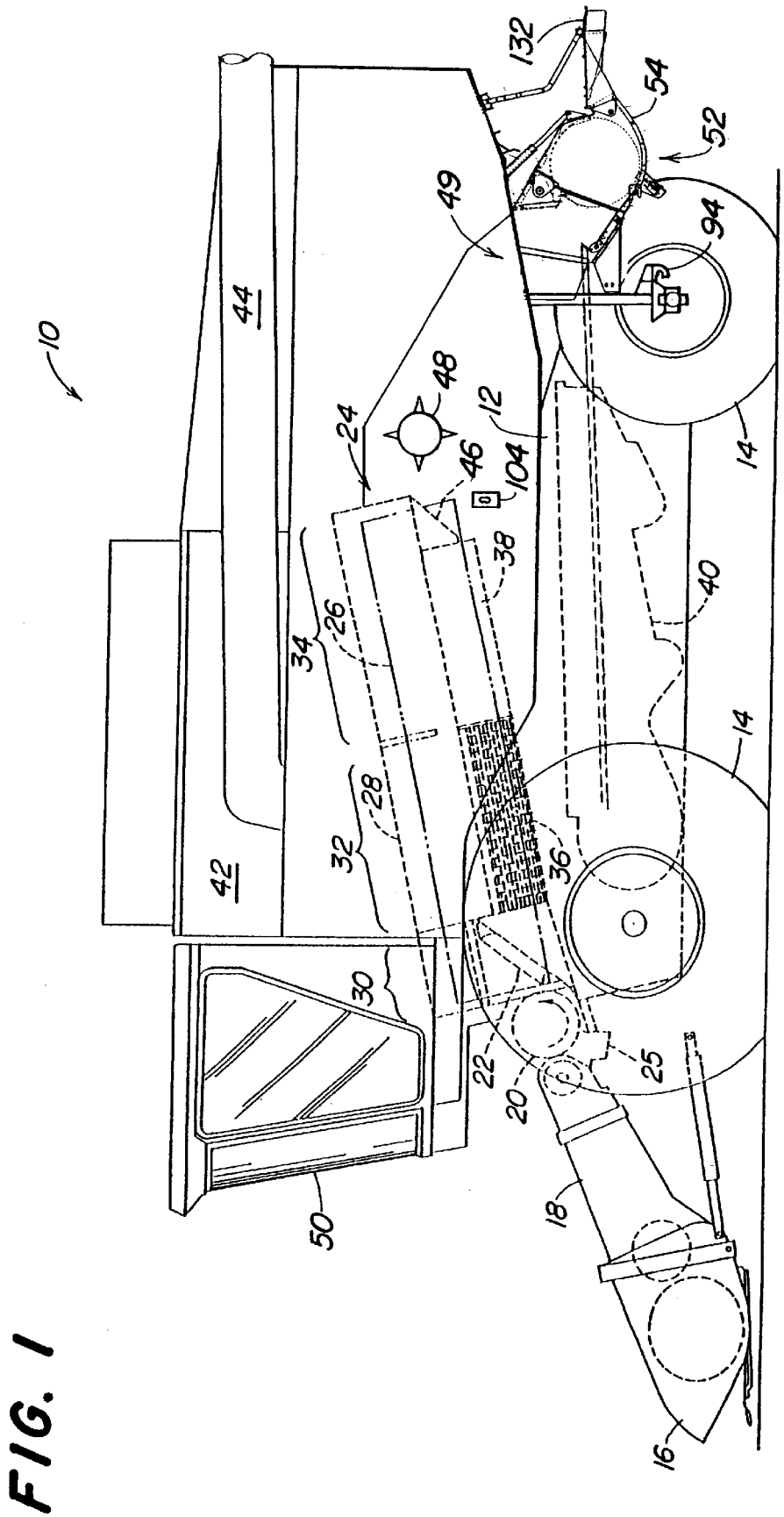
FIG. 1 is a side view of a combine equipped with the chopper of the present invention.

An agricultural combine 10 is shown in FIG. 1. The combine 10 includes, among other things, a supporting structure formed by a pair of upright side sheets 12, only one of which is shown in FIG. 1, and ground engaging wheels 14. A harvesting platform 16 is used for harvesting the crop and directing it to a feederhouse 18. The harvested crop is directed by the feederhouse 18 to a beater 20. The beater directs the crop upward through an inlet transition section 22 to a rotary crop-processing unit 24. A rock trap 25 is positioned between the feederhouse and the beater 20.

The rotary crop-processing unit 24 threshes and separates the harvested crop material. It comprises a rotor 26 radially surrounded by a casing 28. The rotor and the casing together define an inlet section 30, and threshing section 32 and a separating section 34. The rotor 26 comprises a hollow cylindrical drum having a plurality of crop processing elements that engage the crop and rotate it in the casing 28.

The bottom of the casing has a concave 36 under the threshing section 32 and a separating grate 38 under the separating section 34.

Grain and chaff falling through the concave 36 and the separating grate 38 are directed to a cleaning system 40. The cleaning system 40 removes the chaff and directs the clean grain to a clean grain elevator (not shown). The clean grain elevator deposits the clean grain in a grain tank 42. The clean grain in the tank 42 can be unloaded into a grain cart or a truck by an unloading auger 44.

Threshed and separated straw is discharged from the rotary crop-processing unit 24 through an outlet 46 to a discharge beater 48. The discharge beater propels the straw downwardly and rearwardly through a discharge outlet 49 at or near the rear of the combine. The operation of the combine is controlled from the operator's cab 50.

Mounted to the side sheets 12 at the lower rear end of the combine is a chopper 52. The chopper 52 includes a chopper housing 54 that rotatably supports a rotor 56 for rotation about a transverse axis. The housing 54 generally surrounds the rotor. A belt drive, not shown, is used to rotate the rotor 56. A plurality of blades or hammers 58 are attached to the rotor and pass between an array of stationary knives 60 mounted to the housing. The blades can be of any of a variety of types. A fan blade is preferred, having a flap portion at the trailing edge of the blade portion that is bent outward at a right angle to the blade portion to generate a fan action to facilitate the dispersal of the chopped straw. Such a blade is shown in U.S. Pat. No. 5,482,508. The knives 60 are carried by flanges 61 on each side of the housing 54. The stationary knives can be inserted further into the chopper housing or retracted from the housing to vary the extent to which the straw is chopped.

A mounting plate 62 couples the housing 54 to a side sheet extension panel 64 at the pivot 66. The side sheet extension panel 64 extends downward from the side sheet 12. A mounting plate 62 and side sheet extension panel 64 is provided on each side of the combine. The housing 54 is allowed to rotate about the axis 68 of the pivot 66 extending transversely of the combine.

The front of the housing 54 is open, forming an inlet 70 to the housing. The housing further defines a rear outlet 72 for discharge of chopped straw therefrom.

Figure 2:
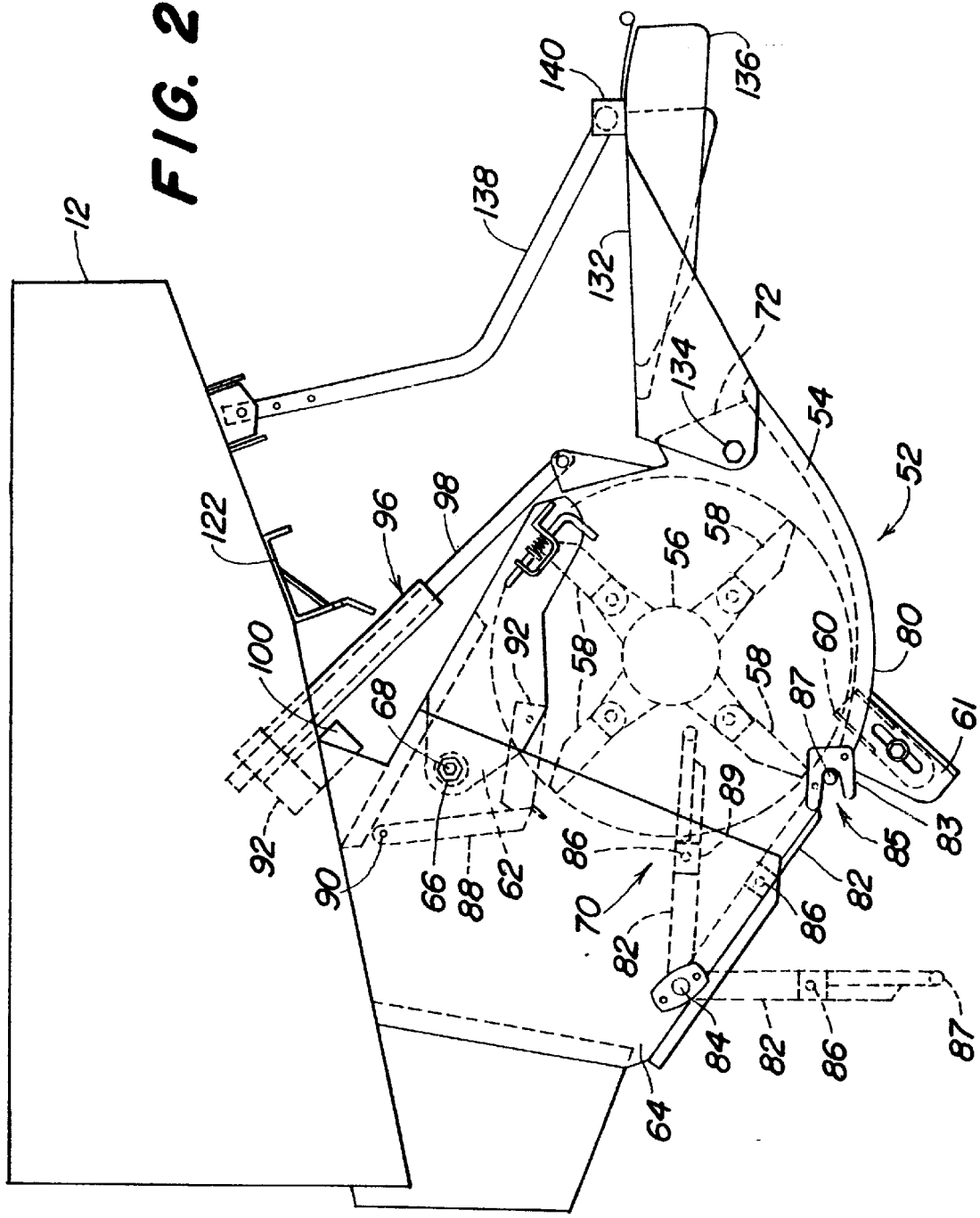
FIG. 2 is an enlarged side view of the rear portion of the combine with the chopper of the present invention in a chopping position.
Figure 3:
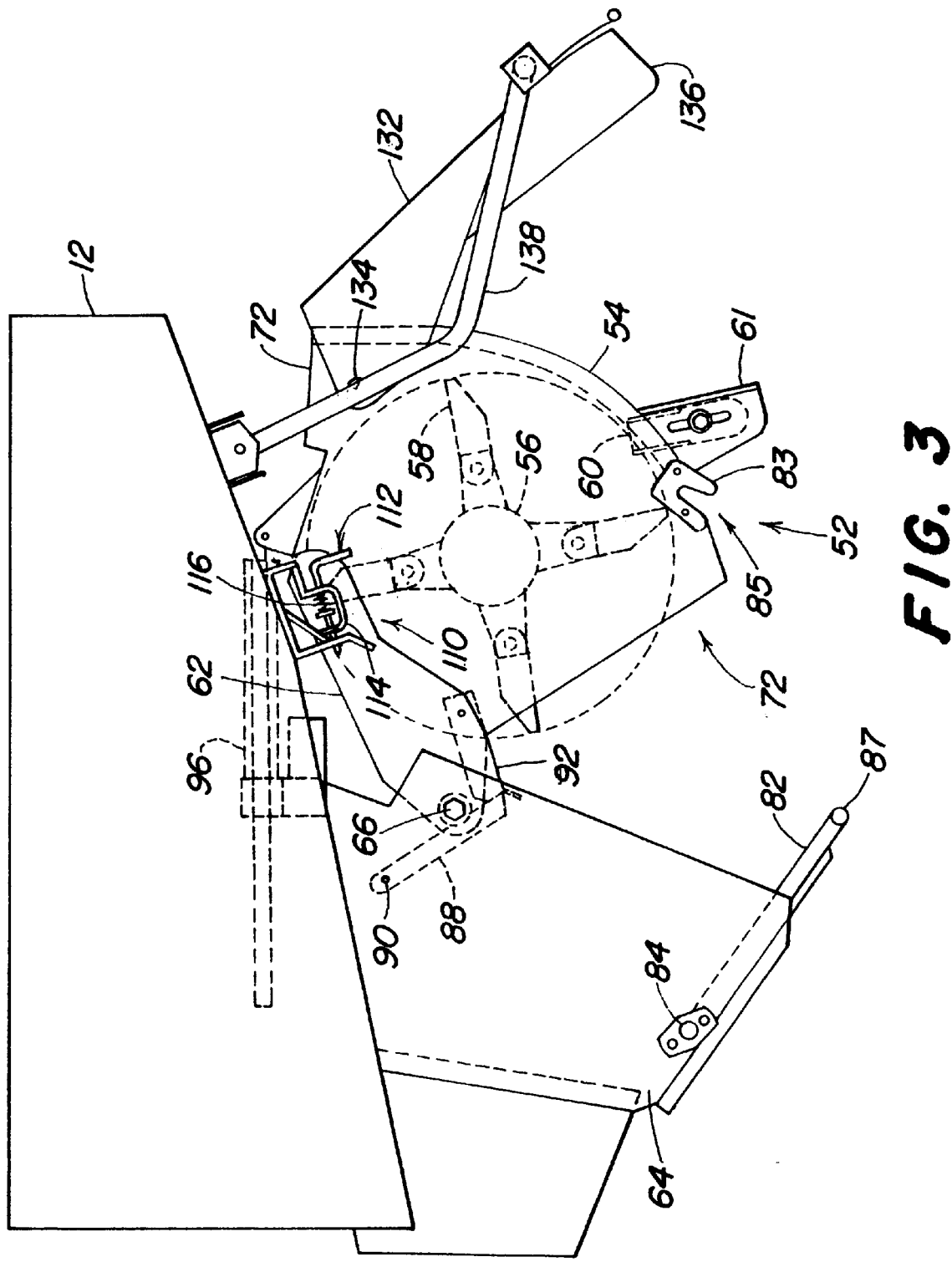
FIG. 3 is an enlarged side view of the rear portion of the combine with the chopper of the present invention in a windrowing position.
Figure 4:
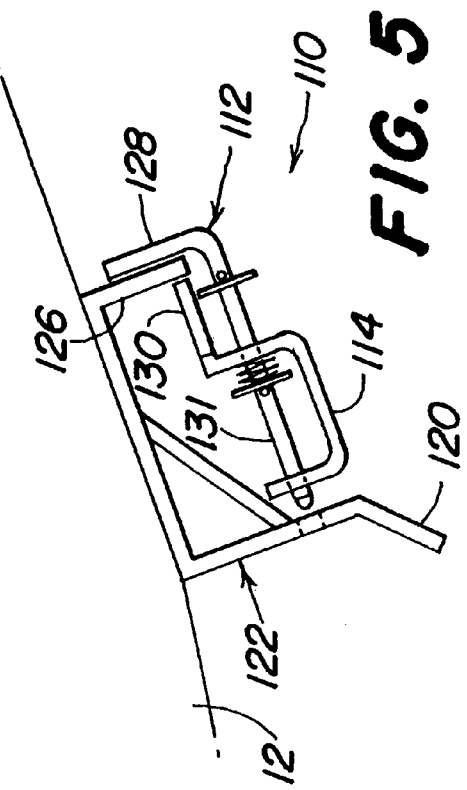
FIG. 4 is an enlarged side view of the latch for holding the housing in the windrowing position with the latch engaged.

The chopper housing 54 is moved from a chopping position as shown in FIG. 2 to a windrowing position shown in FIG. 3. In the chopping position, the front end of the housing lower panel 80 engages the trailing edge of a chopper inlet door 82. The inlet door 82 extends across the combine and is pivotally mounted to the side sheet extension panels 64 by pivots 84. The chopper housing 54 includes a flange 83 with an open slot 85 at each lateral side. The slot 85 receives a pin 87 projecting laterally from each side of the inlet door 82 when the housing is in the chopping position. This ensures proper alignment of the housing with the inlet door. A retractable pin 86 holds the inlet door 82 in a position in which it is inclined downwardly and rearwardly from the pivot 84. The pivot 84 is positioned generally adjacent the rear end of the chaffer whereby the inlet door directs both chaff and straw into the chopper housing.

The inlet door 82 is pivotally mounted to the combine so that the inlet door can be rotated downward from the inclined position to a vertical position as shown in FIG. 2 to further improve access to the rear of the combine. Rotation of the inlet door is accomplished by retracting the pins 86 from the side sheets of the combine to free the door to rotate about the pivot 84. In addition, the inlet door can be rotated upward to a generally horizontal, rearwardly extending position (FIG. 2) and locked in place by inserting the pins 86 through the apertures 89 in the side sheet extension panels 64. In this position, convenient access is provided to a tow hook 94 mounted on the rear axle of the combine (FIG. 1).

An inlet deflector 88, in the form of a panel, extends between the two side sheet extension panels 64 and is pivotally mounted at pivot 90. The inlet deflector 88 prevents any crop residue from entering the top portion of the chopper housing where the rotating chopper blades can propel the crop residue forward into the chaffer. Crop residue, such as corncobs, can damage the chaffer if they are propelled into the chaffer by the chopper. The inlet deflector 88 is connected to the chopper housing by links 92 on each side. As the chopper housing is moved upward and rearward to the windrowing position, the links 92 cause the inlet deflector 88 to rotate rearward and upward, providing greater access into the rear of the combine and allowing room for pulling the sieve and chaffer elements rearward from the cleaning shoe.

A powered lift actuator 96 extends between the chopper housing 54 and the combine structure to raise and lower the chopper housing. The actuator includes a screw actuator 98 driven by an electric motor 100 through a transmission 102. A toggle switch 104 on the side of the combine, FIG. 1, is used to actuate the electric motor 100 to drive the actuator 96. By using an electric driven actuator, the chopper housing can be moved between the chopping and windrowing positions without operation of the combine engine. A hydraulic cylinder can also be used to move the chopper housing, however this would require operation of the combine engine to provide the hydraulic fluid pressure. Other mechanical drive devices can be used as well, including linkages and gear drives.

A latch 110 is provided on each side of the chopper housing to attach the chopper housing to the combine structure when it is raised to the windrowing position. By latching the chopper housing in a raised position, the weight of the chopper housing need not be supported by the powered lift actuator once the chopper housing is in the windrowing position. The latch 110 includes an L-shaped pin 112 carried by a bracket 114 on each side of the chopper housing. A spring 116 biases the pin to the left as viewed in the figures. As the chopper housing is raised, the spherical end 118 of the pin 112 engages the angled end portion 120 of a bracket 122 mounted to the combine side sheet. The bracket end portion 120 causes the pin 112 to move against the biasing force of the spring 116. When the chopper housing reaches the windrowing position, the pin 112 will snap through an aperture 124 in the bracket 122 and lock the chopper housing to the combine structure in the windrowing position.

Figure 5:
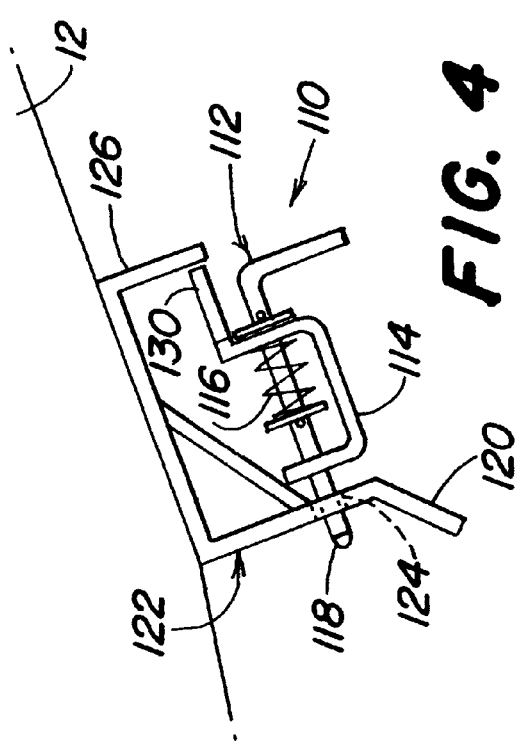
FIG. 5 is an enlarged side view of the latch for holding the housing in the windrowing position with the latch released.
Figure 6:
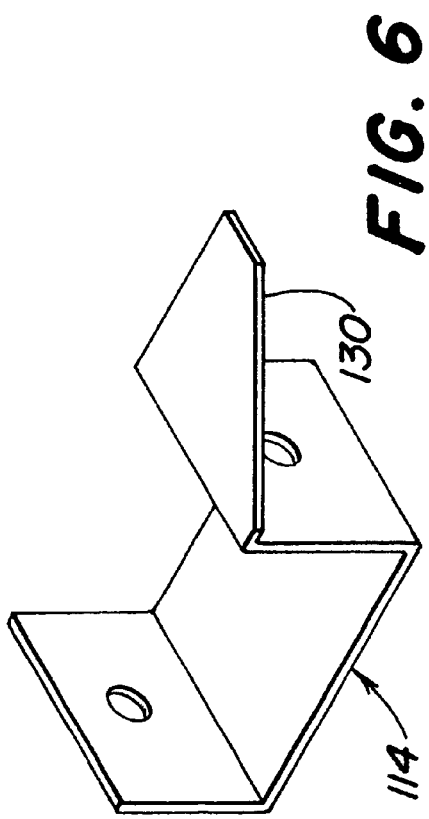
FIG. 6 is a perspective view of a bracket supporting the pin of the latch.

Before the chopper housing can be lowered, the operator must first manually disengage the pin 112 on each side of the chopper. The pin 112 is withdrawn from the aperture 124 and retained in the withdrawn position (FIG. 5) by resting the leg 128 of the pin on the down turned flange portion 126 of the bracket 122. As the chopper housing begins to move downward, the pin 112 will clear the down turned flange portion 126 of the bracket 122. When this occurs, the spring 116 will bias the pin 112 forward. This causes the leg 128 of the pin 112 to contact the angled edge 130 of the bracket 114. This causes the pin 112 to rotate about the axis of the pin main leg 131 so that the leg 128 points outward or downward. This prevents interference between the leg 128 and the down turned flange portion 126 of the bracket 122 when the chopper housing is next raised.

A tailboard deflector 132 is pivotally mounted to the housing 54 at the pivot 134, FIG. 2. The tailboard deflector has a plurality of fins 136 to deflect the exiting chopped straw laterally outward over a substantial width. The fins are adjustable in position to vary the width of the straw distribution. A pivot bar 138 is rotatably coupled to both of the side sheets. The pivot bar is also rotatably coupled to the tailboard deflector 132 in bushings 140. As the chopper housing is rotated between the chopping and windrowing positions, the pivot bar 138 causes the tailboard deflector to rotate about the pivot 134 relative to the chopper housing. This enables the tailboard deflector to move between the use position shown in FIG. 2 and the folded position shown in FIG. 3.

The chopper of the present invention, by pivoting the housing about a transverse axis between a chopping position and a rearwardly raised windrowing position, provides improved access to the rear of the combine for service and maintenance operations. In addition, the electric powered lift actuator enables the chopper housing to be raised and lowered without requiring that the combine engine be operating. The pivoting inlet door to the chopper housing further provides improved access to the rear of the combine as does the pivoting inlet deflector at the top of the chopper housing inlet.

The invention should not be limited to the above-described embodiment, but should be limited solely by the claims that follow.

What is claimed is:

1. A chopper for a combine harvester having a structure and being adapted to move over a field to gather and process an agricultural crop having straw which, after processing, is discharged from a separator, the chopper comprising:

a rotor rotatable about a transverse axis;

a chopper housing supporting and surrounding the rotor, the housing defining an inlet and an outlet for the straw;

the housing being mounted to the combine for rotation about a transverse pivot axis to move between a chopping position and a windrowing position, the inlet being positioned to receive discharged straw when the housing is in the chopping position, the housing rotating upward and rearward about the transverse pivot axis when moving to the windrowing position wherein the inlet is positioned to not receive discharged straw whereby the straw is allowed to fall from the combine to the ground without passing through the housing; and an inlet door mounted to the combine and inclined downward and rearward to the housing in the chopping position to direct straw into the inlet of the housing, the inlet door being pivotally mounted to the combine for selective rotation to a generally vertical position extending downward to facilitate access into the rear of the combine when the chopper is in the windrowing position.

2. The chopper as defined by claim 1 wherein the inlet door is pivotally mounted to the combine for selective rotation to a generally horizontal position extending rearward when the housing is in the windrowing position to facilitate access to the combine below the inlet door.

3. The chopper as defined by claim 1 further comprising a tailboard deflector mounted to the housing adjacent the outlet.

4. The chopper as defined by claim 3 wherein the tailboard deflector is pivotally mounted to the housing and is coupled to the combine by a linkage to rotate the tailboard relative to the housing when the chopper is moved between the chopping position and the windrowing position.

5. The chopper as defined by claim 1 further comprising an inlet deflector pivotally mounted to the combine above the housing inlet, and a linkage coupling the deflector to the housing to pivot the deflector upward and rearward as the housing is pivoted to the windrowing position.

6. A chopper for a combine harvester having a structure and being adapted to move over a field to gather and process an agricultural crop having straw which, after processing, is discharged from a separator, the chopper comprising:

a rotor rotatable about a transverse axis;

a chopper housing supporting and surrounding the rotor, the housing defining an inlet and an outlet for the straw;

the housing being mounted to the combine for rotation about a transverse pivot axis to move between a chopping position and a windrowing position, the inlet being positioned to receive discharged straw when the housing is in the chopping position, the housing rotating upward and rearward about the transverse pivot axis when moving to the windrowing position wherein the inlet is positioned to not receive discharged straw whereby the straw is allowed to fall from the combine to the ground without passing through the housing;

a powered lift actuator to move the housing between the chopping and windrowing positions; and a latch to couple the housing to the combine structure when the housing is in the windrowing position wherein the powered lift actuator does not hold the housing in the windrowing position.

7. The chopper as defined by claim 6 wherein the powered lift actuator includes an electric motor driven screw actuator.

8. The chopper as defined by claim 6 further comprising a switch on one side of the combine to operate the actuator to move the housing.

9. The chopper as defined by claim 6 wherein the latch includes a latch plate and a spring biased pin that automatically engages the latch plate in a latched position when the housing rotates into the windrowing position.

10. A chopper for a combine harvester having a structure and being adapted to move over a field to gather and process an agricultural crop having straw which, after processing, is discharged from a separator, the chopper comprising:

a rotor rotatable about a transverse axis;

a chopper housing supporting and surrounding the rotor, the housing defining an inlet and an outlet for the straw;

the housing being mounted to the combine for movement relative to the combine between a chopping position and a windrowing position;

a powered lift actuator coupled to the housing and the combine to move the housing relative to the combine; and a switch on one side of the combine to operate the powered lift actuator to move the housing between the chopping and windrowing positions.

11. The chopper as defined by claim 10 wherein the powered lift actuator is powered by electricity.

* * * * *